United States Patent
Lo et al.

(10) Patent No.: US 11,194,945 B1
(45) Date of Patent: Dec. 7, 2021

(54) CLOCK DEADLOCK DETECTING SYSTEM, METHOD, AND NON-TRANSITORY COMPUTER READABLE STORAGE MEDIUM

(71) Applicant: Realtek Semiconductor Corporation, Hsinchu (TW)

(72) Inventors: I-Hsiu Lo, Hsinchu (TW); Yung-Jen Chen, Hsinchu (TW); Yu-Lan Lo, Hsinchu (TW); Shu-Yi Kao, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 17/236,193

(22) Filed: Apr. 21, 2021

(30) Foreign Application Priority Data

Aug. 19, 2020 (TW) .................................. 109128302

(51) Int. Cl.
*G06F 30/3312* (2020.01)
*G06F 30/333* (2020.01)
(Continued)

(52) U.S. Cl.
CPC ........ *G06F 30/3312* (2020.01); *G06F 30/333* (2020.01); *H03L 7/095* (2013.01);
(Continued)

(58) Field of Classification Search
CPC ............... G06F 30/333; G06F 30/3312; G06F 30/3323; G06F 30/373; G06F 30/398; H03L 7/095
(Continued)

(56) References Cited

U.S. PATENT DOCUMENTS 5,761,454 A * 6/1998 Adusumilli ......... G06F 13/4226
710/105
6,061,361 A * 5/2000 An ........................ G06F 13/364
370/438

(Continued)

OTHER PUBLICATIONS

Qing Wu et al., "Clock-gating and its application to low power design of sequential circuits," IEEE Transactions on Circuits and Systems I: Fundamental Theory and Applications, vol. 47, No. 3, pp. 415-420, Mar. 2000.

(Continued)

*Primary Examiner* — Phallaka Kik
(74) *Attorney, Agent, or Firm* — Locke Lord LLP; Tim Tingkang Xia, Esq.

(57) ABSTRACT

A clock deadlock detecting system includes a memory and a processor. The memory is configured to store at least one computer program. The processor is configured to execute the at least one computer program to perform following operations: extracting hierarchy information of a plurality of integrated clock gating (ICG) cells, in which the hierarchy information is a description of a circuit structure of the ICG cells; generating at least one checking property according to integrated circuit design information and the hierarchy information; determining whether the ICG cells satisfy the at least one checking property according to the integrated circuit design information and a formal method to determine whether the ICG cells is expected to fall into at least one clock deadlock state, so as to generate a determination result; and modifying the integrated circuit design information according to the determination result.

20 Claims, 6 Drawing Sheets

(51) Int. Cl.
*G06F 30/3323* (2020.01)
*G06F 30/373* (2020.01)
*G06F 30/398* (2020.01)
*H03L 7/095* (2006.01)

(52) U.S. Cl.
CPC ........ *G06F 30/3323* (2020.01); *G06F 30/373* (2020.01); *G06F 30/398* (2020.01)

(58) Field of Classification Search
USPC .................... 716/108, 113, 136, 134; 703/16
See application file for complete search history.

(56) References Cited

U.S. PATENT DOCUMENTS

| | | | | |
|---|---|---|---|---|
| 8,381,148 | B1* | 2/2013 | Loh | G06F 30/327 716/106 |
| 10,108,767 | B1* | 10/2018 | Purri | G06F 30/327 |
| 2006/0224911 | A1* | 10/2006 | Lewis | G06F 1/08 713/500 |
| 2012/0101800 | A1* | 4/2012 | Miao | G06F 11/3608 703/22 |
| 2012/0151263 | A1* | 6/2012 | Rentschler | G06F 11/22 714/30 |
| 2013/0204580 | A1* | 8/2013 | Boehl | G06F 11/0757 702/186 |
| 2015/0067369 | A1* | 3/2015 | Henry | G06F 9/522 713/323 |
| 2016/0210381 | A1* | 7/2016 | Singleton | G06F 13/4252 |
| 2016/0314223 | A1* | 10/2016 | Darbari | G06F 11/3608 |
| 2019/0020586 | A1* | 1/2019 | Karanam | H04L 47/12 |

OTHER PUBLICATIONS

L. Benini et al., "Automatic Synthesis of Gated Clocks for Power Reduction in Sequential Circuits," IEEE Design and Test of Computers, 1994.
F. Emnett, et al., "Power Reduction Through RTL Clock Gating," SNUG, San Jose, 2000.
Newcombe, Chris et al., "How Amazon Web Services Uses Formal Methods." Communications of the ACM, Apr. 2015, vol. 58, No. 4, pp. 66-73.
Thierry Lecomte et al., "Formal Methods in Safety-Critical Railway Systems," Proceedings of Brazilian Symposium on Formal Methods: SMBF 2007.
J. Harrison, "Formal verification at Intel," Proceedings of the 18th Annual IEEE Symposium of Logic in Computer Science, 2003.

* cited by examiner

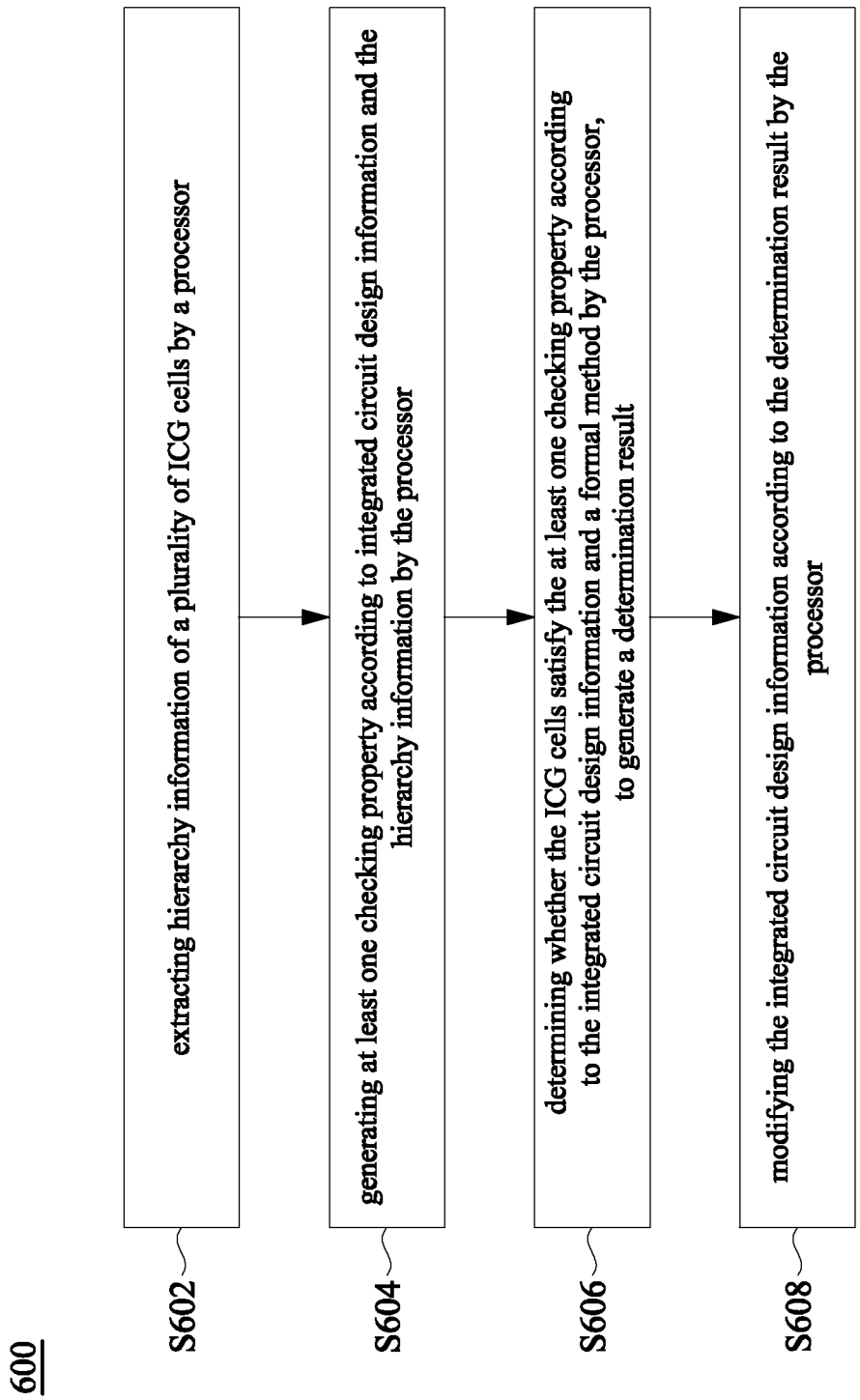

CLOCK DEADLOCK DETECTING SYSTEM, METHOD, AND NON-TRANSITORY COMPUTER READABLE STORAGE MEDIUM

RELATED APPLICATIONS

This application claims priority to Taiwanese Application Serial Number 109128302, filed Aug. 19, 2020, which is herein incorporated by reference.

BACKGROUND

Technical Field

The present disclosure relates to detection technology. More particularly, the present disclosure relates to a detecting system, a detecting method, and a non-transitory computer readable storage medium for a clock deadlock detection.

Description of Related Art

With developments of circuit technology, integrated circuits have been applied to various fields. In some applications, operation efficiency and power consumption of an integrated circuit are important. For example, in the applications of mobile devices and internet of things (IoT), low power consumption is pursued.

In some related arts, clock signals are controlled for the requirement of low power consumption. However, circuits would unexpectedly operate if the clock signals are not controlled correctly.

SUMMARY

Some aspects of the present disclosure are to provide a clock deadlock detecting system. The clock deadlock detecting system includes a memory and a processor. The memory is configured to store at least one computer program. The processor is configured to execute the at least one computer program to perform following operations: extracting hierarchy information of a plurality of integrated clock gating (ICG) cells, in which the hierarchy information is a description of a circuit structure of the ICG cells; generating at least one checking property according to integrated circuit design information and the hierarchy information; determining whether the ICG cells satisfy the at least one checking property according to the integrated circuit design information and a formal method to determine whether the ICG cells are expected to fall into at least one clock deadlock state, so as to generate a determination result; and modifying the integrated circuit design information according to the determination result.

Some aspects of the present disclosure are to provide a clock deadlock detecting method. The clock deadlock detecting method includes following operations: extracting, by a processor, hierarchy information of a plurality of integrated clock gating (ICG) cells, in which the hierarchy information is a description of a circuit structure of the ICG cells; generating, by the processor, at least one checking property according to integrated circuit design information and the hierarchy information; determining, by the processor, whether the ICG cells satisfy the at least one checking property according to the integrated circuit design information and a formal method to determine whether the ICG cells are expected to fall into at least one clock deadlock state, so as to generate a determination result; and modifying, by the processor, the integrated circuit design information according to the determination result.

Some aspects of the present disclosure are to provide a non-transitory computer readable storage medium including at least one computer program. A processor is for executing the at least one computer program to perform following operations: extracting hierarchy information of a plurality of integrated clock gating (ICG) cells, in which the hierarchy information is a description of a circuit structure of the ICG cells; generating at least one checking property according to integrated circuit design information and the hierarchy information; determining whether the ICG cells satisfy the at least one checking property according to the integrated circuit design information and a formal method to determine whether the ICG cells are expected to fall into at least one clock deadlock state, so as to generate a determination result; and modifying the integrated circuit design information according to the determination result.

As described above, the clock deadlock detecting system, the clock deadlock detecting method, and the non-transitory computer readable storage medium of the present disclosure can effectively detect potential clock deadlocks in the circuit to ensure that the designed circuit can operate correctly.

BRIEF DESCRIPTION OF THE DRAWINGS

The disclosure can be more fully understood by reading the following detailed description of the embodiment, with reference made to the accompanying drawings as follows:

FIG. 6 is a flow diagram of a clock deadlock detecting method according to some embodiments of the present disclosure.

DETAILED DESCRIPTION

The following embodiments are disclosed with accompanying diagrams for detailed description. For better understanding, many details of practice are explained in the following descriptions. However, it should be understood that these details of practice do not intend to limit the present disclosure. That is, these details of practice are not necessary in part of embodiments of the present embodiments.

In the present disclosure, "connected" or "coupled" may refer to "electrically connected" or "electrically coupled." "Connected" or "coupled" may also refer to operations or actions between two or more elements.

Figure 1:
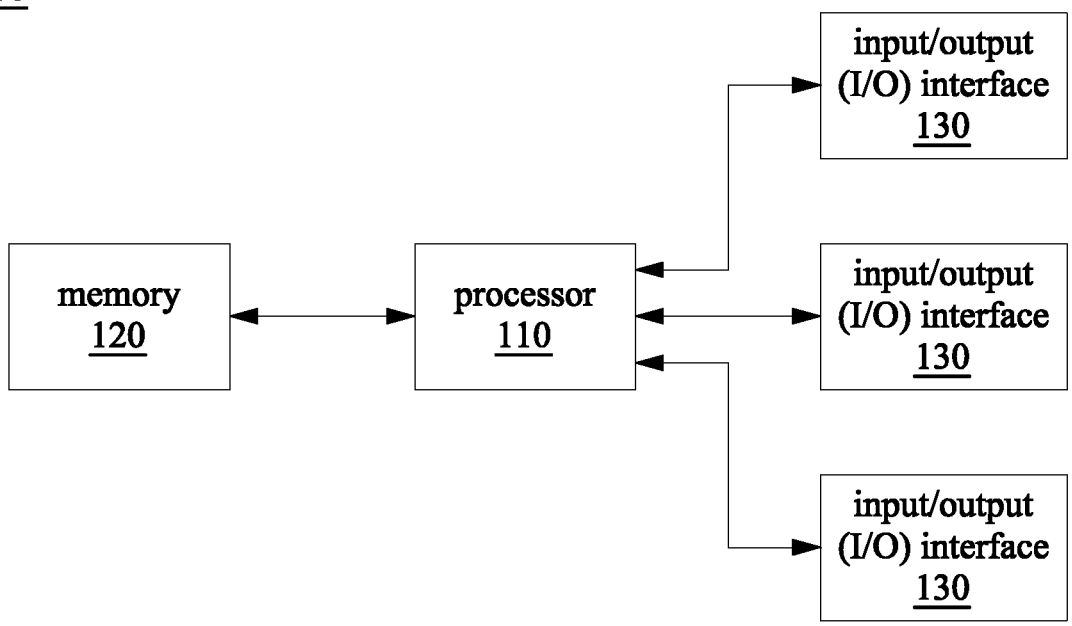
FIG. 1 is a schematic diagram of a circuit design system according to some embodiments of the present disclosure.

Reference is made to FIG. 1. FIG. 1 is a schematic diagram of a circuit design system 100 according to some embodiments of the present disclosure. As illustrated in FIG. 1, the circuit design system 100 includes a processor 110, a memory 120, and one or more input/output (abbr., I/O) interfaces 130. The processor 110 is coupled to the memory 120 and the I/O interfaces 130 (three I/O interfaces 130 are shown in FIG. 1 for illustration).

In some embodiments, the processor 110 can be a CPU, an application-specific integrated circuit (ASIC), multiple processors, a distributed processing system, or other suitable processing circuits. Various circuits or elements which can implement the processor 110 are within the contemplated scopes of the present disclosure.

The memory 120 stores one or more computer programs, and the one or more computer programs are encoded with multiple instruction sets, in which the instruction sets are configured to detect whether a clock deadlock exists in a chip or in an integrated circuit. The processor 110 can execute the computer programs stored in the memory 120 to perform operations (as illustrated in FIG. 6) for the clock deadlock detection. The "clock deadlock" represents that a clock signal is provided inaccurately or the clock signal is stopped being provided incorrectly, such that the circuit unexpectedly operates. The details about the "dock deadlock" are described in following paragraphs with FIG. 2B.

In some embodiments, the memory 120 is a non-transitory computer readable storage media. In some embodiments, a computer-readable storage media is electrical, magnetic, optical, infrared and/or semiconductor system (or apparatus or device). For example, a computer-readable storage media include a semiconductor memory or a solid-state memory, a magnetic tape, and a removable computer magnetic disk, a random access memory (RAM), a read-only memory (ROM), a hard disk and/or an optical disk. In one or more embodiments using the optical disk, the computer-readable storage medium includes a CD-ROM, a CD-RMI and/or a DVD.

The I/O interfaces 130 receive inputs or commands from various control devices, in which the control devices may be operated by a circuit designer. Accordingly, the circuit design system 100 is controlled by the inputs or the commands received from the I/O interfaces 130. For example, the circuit designer can input a netlist file corresponding to an integrated circuit through the I/O interfaces 130, and then the processor 110 performs a subsequent analyzing process and a subsequent processing process.

In some embodiments, an output interface of the I/O interfaces 130 includes a display panel (e.g., a screen), and the output interface is configured to display an executing state of the computer program. In some embodiments, the output interface of the I/O interfaces 130 includes a graphic user interface (GUI). In some other embodiments, an input interface of the I/O interfaces 130 includes a keyboard, a numeric keyboard, a mouse, a trackball, a touch screen, cursor direction keys, or a combination thereof, to transmit information and commands to the processor 110.

Figure 2A:
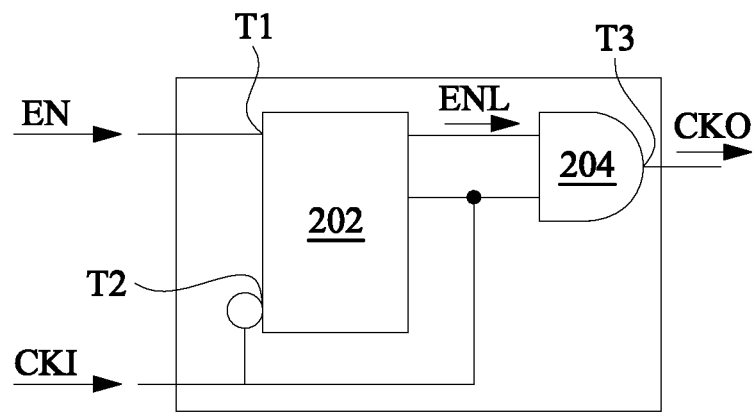
FIG. 2A is a schematic diagram of an integrated clock gating cell according to some embodiments of the present disclosure.

Reference is made to FIG. 2A. FIG. 2A is a schematic diagram of an integrated clock gating (ICG) cell 200 according to some embodiments of the present disclosure. In an integrated circuit, the ICG cell 200 is controlled to provide a clock signal (e.g., a clock output signal CKO) to other circuit elements or to stop providing (blocking) the clock signal to other circuit elements. After the ICG cell 200 provides the dock signal to the circuit elements requiring the clock signal, the circuit elements can operate correctly. If the ICG cell 200 can dynamically stop providing the dock signal to the circuit elements which do not require the clock signal at any specific time, overall power consumption of the system can be reduced.

As illustrated in FIG. 2A, the ICG cell 200 includes an enable input terminal T1, a clock input terminal T2, and a clock output terminal T3. The enable input terminal T1 is configured to receive an enable signal EN. The clock input terminal T2 is configured to receive a clock input signal CKI. The ICG cell 200 generates the clock output signal CKO at the clock output terminal T3 according to the enable signal EN and the clock input signal CKI.

To be more specific, the ICG cell 200 includes a latch circuit 202 and a (logic) AND gate 204. The latch circuit 202 is configured to receive the enable signal EN and the clock input signal CKI to output a control signal ENL according to the enable signal EN and the clock input signal CKI. The AND gate 204 receives the control signal ENL and the clock input signal CKI to output the dock output signal CKO according to the control signal ENL and the dock input signal CKI.

Figure 2B:
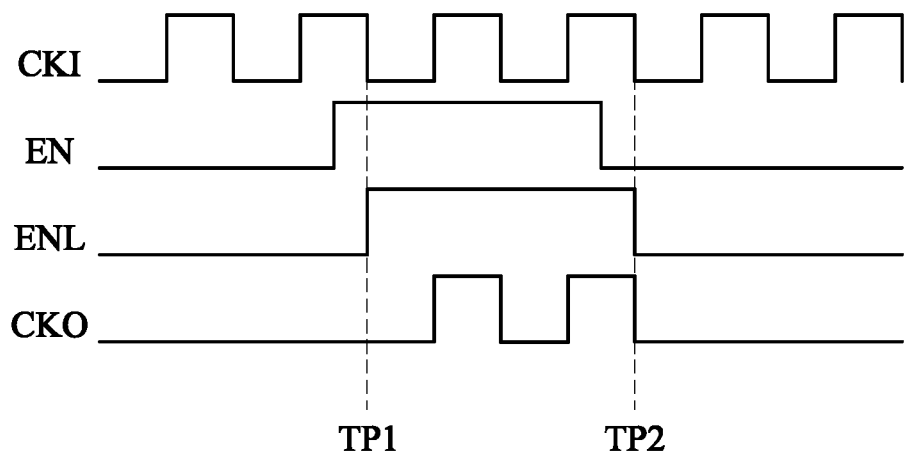
FIG. 2B is a timing diagram of the integrated clock gating cell in FIG. 2A according to some embodiments of the present disclosure.

Reference is made to FIG. 2B. FIG. 2B is a timing diagram of the ICG cell in FIG. 2A according to some embodiments of the present disclosure.

For example, at a time point TP1, the enable signal EN has a logic value 1. At this time point, the dock input signal CKI has a logic value 0, and the enable signal EN is transmitted through the latch circuit 202 as the control signal ENL. The control signal ENL has a logic value 1. Accordingly, the ICG cell 200 outputs the clock input signal CKI through the AND gate 204 as the clock output signal CKO. At a time point TP2, the enable signal EN has a logic value 0. As this time point, the clock input signal CKI has a logic value 0, and then the enable signal EN is transmitted through the latch circuit 202 as the control signal ENL. The control signal ENL has a logic value 0. Accordingly, the ICG cell 200 cannot output the clock input signal CKI through the AND gate 204, so the clock output signal CKO has a logic value 0.

It is noted that the ICG cell 200 in FIG. 2A is merely for illustration and the present disclosure is not limited thereto. Other implementations of the ICG cell are within the contemplated scopes of the present disclosure.

As described above, the ICG cell 200 stops providing the clock signal to the circuit elements which (temporarily) do not require the clock signal, and thus overall power consumption of the system can be reduced. However, if the ICG cell 200 mistakenly stops providing the clock signal to the circuit elements that requires the dock signal, the circuit elements would operate incorrectly.

Figure 3:
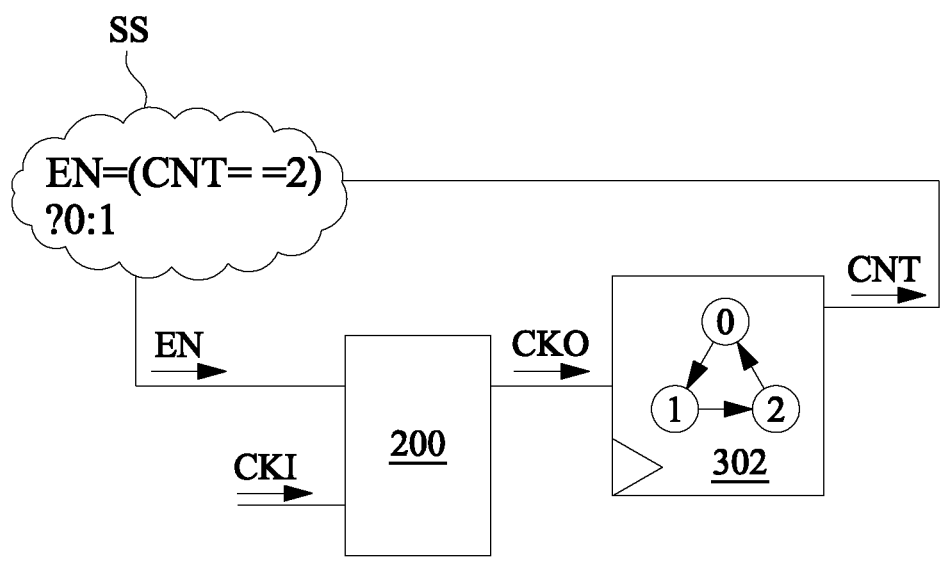
FIG. 3 is a schematic diagram of an integrated clock gating cell with a clock deadlock according to some embodiments of the present disclosure.

Reference is made to FIG. 3. FIG. 3 is a schematic diagram of the integrated clock gating cell 200 with a clock deadlock according to some embodiments of the present disclosure. As illustrated in FIG. 3, the ICG cell 200 is coupled to a counter 302. The counter 302 is configured to receive the clock output signal CKO outputted by the ICG cell 200. The clock output signal CKO can drive the counter 302 to establish a count. For example, an initial count value CNT of the counter 302 is 0. In the first cycle, based on a determination operation SS (the determination logic is: the outputted enable signal EN has a logic value 0 if the count value CNT is 2, otherwise the outputted enable signal EN has a logic value 1), the enable signal EN has a logic value 1 since the initial count value CNT is not 2. Then, since the enable signal EN has the logic value 1, the dock input signal CKI can be outputted by the ICG cell 200 as the clock output signal CKO. In this situation, since the ICG cell 200 can output the clock output signal CKO correctly, the dock output signal CKO controls the count value CNT of the counter 302 to change from 0 to 1. In the second cycle, based on the determination operation SS, the enable signal EN has a logic value 1 since the count value CNT is not equal to 2. Since the enable signal EN has the logic value 1, the clock input signal CKI can be outputted by the ICG cell 200 as the clock output signal CKO. Similarly, since the ICG cell 200 can output the clock output signal CKO correctly, the clock output signal CKO controls the count value CNT of the counter 302 to change from 1 to 2. In the third cycle, based on the determination operation SS, it triggers that the enable signal EN has a logic value 0 since the count value CNT is equal to 2. Since the enable signal EN has the logic value 0, the clock input signal CKI cannot be outputted by the ICG cell 200 as the clock output signal CKO. In subsequent cycles, the count value CNT is kept at 2. Since the count value CNT is kept at 2, the enable signal EN is always at the logic value 0. Accordingly, the clock input signal CKI cannot be outputted by the ICG cell 200 as the clock output signal CKO, which means the output clock of the ICG cell 200 could no longer toggle. This indicates that the combination of the ICG cell 200 and the counter 302 can fall into "a clock deadlock" based on the determination operation SS.

It is noted that the embodiments of the ICG cell 200 in FIG. 3 with the clock deadlock is merely for illustration and the present disclosure is not limited thereto. Various embodiments are within the contemplated scopes of the present disclosure. In addition, the determination operation SS in FIG. 3 can be executed by the processor 110 in FIG. 1.

Figure 4:
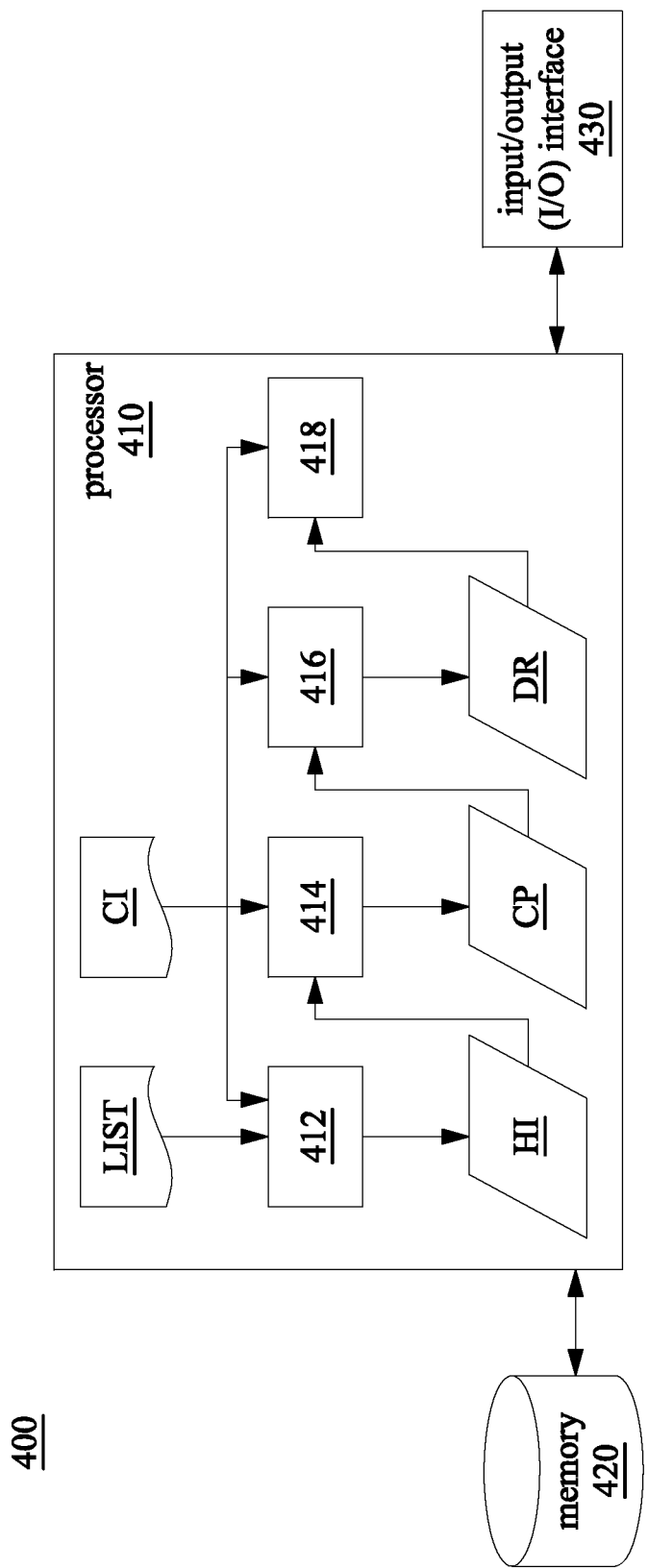
FIG. 4 is a schematic diagram of a clock deadlock detecting system according to some embodiments of the present disclosure.

Reference is made to FIG. 4. FIG. 4 is a schematic diagram of a clock deadlock detecting system 400 according to some embodiments of the present disclosure. As illustrated in FIG. 4, the clock deadlock detecting system 400 includes a processor 410, a memory 420, and one or more I/O interfaces 430 (only one I/O interfaces 430 is shown in FIG. 4 for illustration). The processor 410 is coupled to the memory 420 and the I/O interface 430. The processor 410, the memory 420, and the I/O interface 430 in FIG. 4 may be implemented by the processor 110, the memory 120, and the I/O interface 130 in FIG. 1 respectively.

The processor 410 includes an information extracting unit 412, a checking property generating unit 414, a formal method calculating unit 416, and a circuit correcting unit 418.

The information extracting unit 412 is configured to receive a to-be-detected list LIST and integrated circuit design information CI. The to-be-detected list LIST records multiple ICG cells to be detected. In some other embodiments, the information extracting unit 412 searches all ICG cells to be detected from the memory 420 or other component databases to generate the to-be-detected list LIST. The information extracting unit 412 is configured to extract hierarchy information HI of the ICG cells in the to-be-detected list LIST. The hierarchy information HI is a description of a circuit structure of the ICG cells. For example, the hierarchy information HI carries a hierarchy structure of enable input terminals (e.g., the enable input terminal T1 in FIG. 2A) of the ICG cells and clock output terminals (e.g., the clock output terminal T3 in FIG. 2A) of the ICG cells.

The checking property generating unit 414 is configured to receive the hierarchy information HI and the integrated circuit design information CI. The integrated circuit design information CI corresponds to a circuit design structure. The checking property generating unit 414 generates at least one checking property CP according to the integrated circuit design information CI and the hierarchy information HI. In some embodiments, the checking property CP at least includes one of a reset deadlock checking property and a run deadlock checking property.

To be more specific, a "reset deadlock" indicates that a circuit is in a clock deadlock state (called a reset deadlock state) at an initial stage. Taking the design in FIG. 3 as an example, as described above, if the count value CNT of the counter 302 is equal to 2 at the initial stage, the enable signal EN always has the logic value 0, such that the clock input signal CKI cannot be outputted as the clock output signal CKO by the ICG cell 200. In this situation, the ICG cell 200 is in the clock deadlock state at the initial stage. This clock deadlock is called the "reset deadlock". Based on the descriptions above, the reset deadlock checking property is, for example, "the enable signal EN always has the logic value 0", but the present disclosure is not limited thereto.

A "run deadlock" indicates that a circuit enters into the clock deadlock state (called a run deadlock state) after the initial stage. Taking the design in FIG. 3 as an example, as described above, if the count value CNT of the counter 302 is 0 or 1 at the initial stage, the clock input signal CKI can be outputted as the clock output signal CKO by the ICG cell 200 in early stage operations. After a period of time (when it enters the third cycle so that the count value CNT changes to be 2), the count value CNT of the counter 302 is kept at 2, such that the ICG cell 200 enters into the clock deadlock state. This clock deadlock is called the "run deadlock". Based on the descriptions above, the run deadlock checking property is, for example, "after the circuit satisfies a specific state, the logic value of the enable signal EN is kept at 0 regardless of the input sequence," but the present disclosure is not limited thereto.

The formal method calculating unit 416 determines whether the ICG cells in the to-be-detected list LIST satisfy the reset deadlock checking property or the run deadlock checking property according to the integrated circuit design information CI and a formal method. If one of the ICG cells satisfies the reset deadlock checking property, the formal method calculating unit 416 determines that the ICG cell is in a reset clock deadlock state. If one of the ICG cells satisfies the run deadlock checking property, the formal method calculating unit 416 determines that the ICG cell is in a run clock deadlock state. Then, the processor 410 generates a determination result DR based on the aforementioned determinations.

The circuit correcting unit 418 is configured to correct the integrated circuit design information CI automatically according to the determination result DR. For example, it can modify the ICG cells having a logic (or combination) that is expected to fall into the clock deadlock state, such that all of the ICG cells in the integrated circuits can provide or stop providing the clock signals accurately. In some embodiments (as FIG. 3), the ICG cells which are expected to fall into the clock deadlock state can be removed and the clock input signal CKI is used to replace the clock output signal CKO directly. In some embodiments (as FIG. 2A), an OR operation can be performed on the original enable signal EN and a set of configurable input signals, and an output is connected to the enable input terminal T1. The set of configurable input signals makes the signal at the enable input terminal T1 to have a logic value 1, such that the ICG cell 200 can output the clock input signal CKI as the clock output signal CKO. In some embodiments, the clock input signal CKI and the original clock output signal CKO are connected to a multiplexer (not shown in the figure), and the selection signal of the multiplexer is a configurable input signal which can achieve the aforementioned functions. The output of the multiplexer is the new clock output signal CKO.

In some other embodiments, the I/O interface 430 outputs a detection report according to the aforementioned determination result DR. The determination result DR or the detection report can record that the ICG cell satisfies the reset deadlock checking property and/or other ICG cell satisfies the run deadlock checking property. A circuit designer can modify the integrated circuit design information CI according to the determination result DR or the detection report (i.e., the determination result DR or the detection report is provided to the circuit designer for debugging).

The detection time for the reset deadlock is shorter and the reset deadlock is basically unacceptable, so in some embodiments, the priority of detecting the reset deadlock is higher than that of detecting the run deadlock. In other words, the processor 410 can determine whether one of the ICG cells satisfies the reset deadlock checking property before determine whether the ICG cell satisfies the run deadlock checking property.

Figure 5:
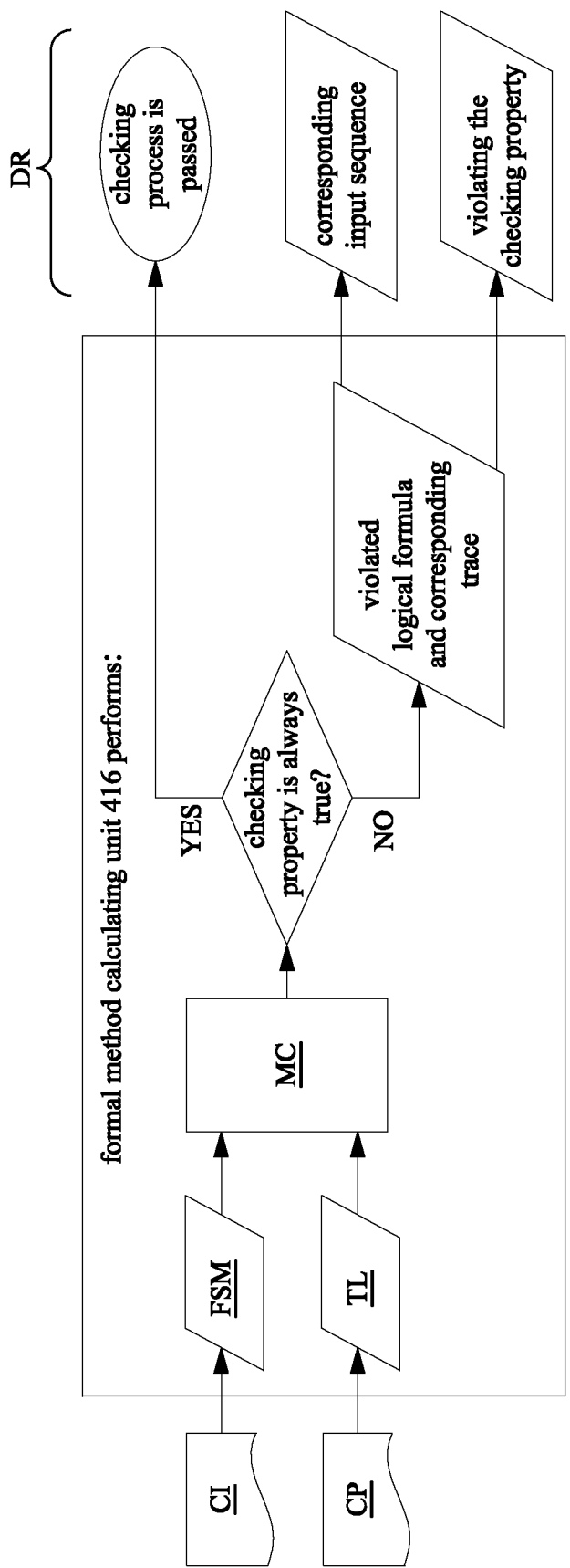
FIG. 5 is a schematic diagram of a formal method according to some embodiments of the present disclosure.

Reference is made to FIG. 5. FIG. 5 is a schematic diagram of a formal method according to some embodiments of the present disclosure. In some embodiments, the formal method calculating unit 416 in FIG. 4 can perform this formal method.

As illustrated in FIG. 5, the formal method calculating unit 416 converts the integrated circuit design information CI and the checking property CP into a finite state model FSM and a time logical formula TL respectively, such that the circuit design and the determination logic is a mathematical problem which satisfies a specific form. Then, a model checking process MC is performed on the finite state model FSM and the time logical formula TL to prove this mathematical problem, so as to determine whether the checking property CP is always true. If the checking property CP is always true, it indicates that the checking is passed. If the checking property CP is not always true, a violated logical formula and a corresponding trace are acquired, and a result of violating the checking property and a corresponding input sequence are acquired. In some embodiments, the model checking process MC may be a Boolean Satisfiability Solver, but the present disclosure is not limited thereto.

In some related arts which adopt simulation-based technology, it can write multiple input patterns in advance, apply these input patterns on entire or part of an integrated circuit, use professional software to simulate derivative operation states, and try to utilize these operation states to check the ICG cells in the to-be-detected list LIST, in order to determine whether a clock deadlock are expected on the ICG cells. However, since the quantity of the input patterns being written in advance is much less than all legal operation states of the integrated circuit, the aforementioned method cannot check the all legal operation states of the integrated circuit. In practical applications, only a few operation states corresponding to some representative input patterns determined by engineering staff are utilized to check the integrated circuit.

Compared to the related arts above, the formal method (e.g., FIG. 5) is utilized to detect possible clock deadlock in the clock deadlock detecting system 400 of the present disclosure. Since the formal method is an exhaustive mathematical proof performed by the model checking process, it does not require all (or any) possible input patterns, and it can detect all legal operation states of the integrated circuit exhaustively and reliably.

Reference is made to FIG. 6. FIG. 6 is a flow diagram of a clock deadlock detecting method 600 according to some embodiments of the present disclosure. As illustrated in FIG. 6, the clock deadlock detecting method 600 includes operations S602, S604, S606, and S608. For ease of understanding, the clock deadlock detecting method 600 in FIG. 6 is described with FIG. 4.

In operation S602, the processor 110 extracts the hierarchy information HI of the ICG cells. The hierarchy information HI is a description of the circuit structure of the ICG cells.

In operation S604, the processor 110 generates the checking property CP according to the integrated circuit design information CI and the hierarchy information HI. In some embodiments, the checking property CP at least includes one of the reset deadlock checking property and the run deadlock checking property. The "reset deadlock" indicates that a circuit is in the dock deadlock state at the initial stage. The "run deadlock" indicates that a circuit enters into the clock deadlock state after the circuit operates for a period of time.

In operation S606, the processor 110 determines whether the ICG cells satisfy the aforementioned checking properties according to the integrated circuit design information CI and the formal method to determine whether the ICG cells is expected to fall into the aforementioned clock deadlock states, so as to generate the determination result DR.

In operation S608, the processor 110 modifies the integrated circuit design information CI according to the aforementioned determination result DR to modify the structure of the integrated circuit. Accordingly, the circuit design system 100 can detect whether any potential clock deadlock exists in the integrated circuit and has the mechanism for modifying the clock deadlock automatically.

In some embodiments, the processor 110 or the processor 410 (or other integrated circuit manufacturing device coupled to the processor 110 or the processor 410, and disposed inside or outside the circuit design system 100 or the clock deadlock detecting system 400) can produce corresponding integrated circuit products (e.g., chips, processors, and so on) according to the determination result DR or the integrated circuit design information CI, but the present disclosure is not limited thereto.

The above description of the clock deadlock detecting method 600 includes exemplary operations, but the order of executing the operations of the clock deadlock detecting method 600 are not limited. The clock deadlock detecting method 600 disclosed in the present disclosure allows operation insertions, operation interchanges, or operation omits in accordance with the spirit and scope of various embodiments of the present disclosure. The operations are able to be executed simultaneously or partially simultaneously as appropriate in accordance with the spirit and scope of various embodiments of the present disclosure.

The clock deadlock detecting method 600 can be implemented by hardware, software, firmware or any combination thereof. For example, if the detecting speed and accuracy are the major considerations, it can be implemented mainly by hardware and/or firmware. Or, if the design flexibility is the major consideration, it can be implemented mainly by software. These implementations are only for illustrations, and the present disclosure is not limited thereto.

As described above, the clock deadlock detecting system, the clock deadlock detecting method, and the non-transitory computer readable storage medium of the present disclosure can effectively detect potential clock deadlocks in the circuit effectively to ensure that the designed circuit can operate correctly.

Various functional components or blocks have been described herein. As will be appreciated by persons skilled in the art, in some embodiments, the functional blocks will preferably be implemented through circuits (either dedicated circuits, or general purpose circuits, which operate under the control of one or more processors and coded instructions), which will typically comprise transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A clock deadlock detecting system, comprising:
   a memory configured to store at least one computer program; and
   a processor configured to execute the at least one computer program to perform following operations:
      extracting hierarchy information of a plurality of integrated clock gating (ICG) cells, wherein the hierarchy information is a description of a circuit structure of the ICG cells;
      generating at least one checking property according to integrated circuit design information and the hierarchy information;
      determining whether the ICG cells satisfy the at least one checking property according to the integrated circuit design information and a formal method to determine whether the ICG cells is expected to fall into at least one clock deadlock state, so as to generate a determination result; and
      modifying the integrated circuit design information according to the determination result.

2. The cock deadlock detecting system of claim 1, wherein the processor determines that one of the ICG cells is expected to fall into a reset deadlock state if the one of the ICG cells satisfies a reset deadlock checking property.

3. The clock deadlock detecting system of claim 2, further comprising:
   an input/output interface configured to output a detection report according to the determination result.

4. The clock deadlock detecting system of claim 3, wherein the detection report records that the one of the ICG cells satisfies the reset deadlock checking property.

5. The clock deadlock detecting system of claim 1, wherein the processor determines that one of the ICG cells is expected to fall into a run deadlock state if the one of the ICG cells satisfies a run deadlock checking property.

6. The clock deadlock detecting system of claim 5, further comprising:
   an input/output interface configured to output a detection report according to the determination result.

7. The clock deadlock detecting system of claim 6, wherein the detection report records that the one of the ICG cells satisfies the run deadlock checking property.

8. The clock deadlock detecting system of claim 1, wherein each of the ICG cells comprises an enable input terminal, a clock input terminal, and a clock output terminal, wherein the hierarchy information extracted by the processor carries a hierarchy structure of the enable input terminals of the ICG cells and the clock output terminals of the ICG cells.

9. The clock deadlock detecting system of claim 1, wherein determining whether the ICG cells satisfy the at least one checking property according to the integrated circuit design information and the formal method to determine whether the ICG cells is expected to fall into the at least one clock deadlock state comprises:
   converting the integrated circuit design information and the at least one checking property into a finite state model and a time logical formula respectively, and performing a model checking process on the finite state model and the time logical formula to determine whether the ICG cells is expected to fall into the at least one dock deadlock state.

10. A clock deadlock detecting method, comprising:
    extracting, by a processor, hierarchy information of a plurality of integrated clock gating (ICG) cells, wherein the hierarchy information is a description of a circuit structure of the ICG cells;
    generating, by the processor, at least one checking property according to integrated circuit design information and the hierarchy information;
    determining, by the processor, whether the ICG cells satisfy the at least one checking property according to the integrated circuit design information and a formal method to determine whether the ICG cells is expected to fall into at least one clock deadlock state, so as to generate a determination result; and
    modifying, by the processor, the integrated circuit design information according to the determination result.

11. The clock deadlock detecting method of claim 10, further comprising:
    determining, by the processor, that one of the ICG cells is expected to fall into a reset deadlock state if the one of the ICG cells satisfies a reset deadlock checking property.

12. The clock deadlock detecting method of claim 11, further comprising:
    outputting, by an input/output interface, a detection report according to the determination result.

13. The clock deadlock detecting method of claim 12, wherein the detection report records that the one of the ICG cells satisfies the reset deadlock checking property.

14. The clock deadlock detecting method of claim 10, further comprising:
    determining, by the processor, that one of the ICG cells is expected to fall into a run deadlock state if the one of the ICG cells satisfies a run deadlock checking property.

15. The clock deadlock detecting method of claim 14, further comprising:
    outputting, by an input/output interface, a detection report according to the determination result.

16. The dock deadlock detecting method of claim 15, wherein the detection report records that the one of the ICG cells satisfies the run deadlock checking property.

17. The clock deadlock detecting method of claim 10, wherein each of the ICG cells comprises an enable input terminal, a clock input terminal, and a clock output terminal, wherein the hierarchy information extracted by the processor carries a hierarchy structure of the enable input terminals of the ICG cells and the clock output terminals of the ICG cells.

18. The clock deadlock detecting method of claim 10, wherein determining whether the ICG cells satisfy the at least one checking property according to the integrated circuit design information and the formal method to determine whether the ICG cells is expected to fall into the at least one clock deadlock state comprises:

converting the integrated circuit design information and the at least one checking property into a finite state model and a time logical formula respectively; and performing a model checking process on the finite state model and the time logical formula to determine whether the ICG cells is expected to fall into the at least one clock deadlock state.

19. A non-transitory computer readable storage medium comprising at least one computer program, a processor for executing the at least one computer program to perform following operations:

extracting hierarchy information of a plurality of integrated clock gating (ICG) cells, wherein the hierarchy information is a description of a circuit structure of the ICG cells;

generating at least one checking property according to integrated circuit design information and the hierarchy information;

determining whether the ICG cells satisfy the at least one checking property according to the integrated circuit design information and a formal method to determine whether the ICG cells is expected to fall into at least one clock deadlock state, so as to generate a determination result; and modifying the integrated circuit design information according to the determination result.

20. The non-transitory computer readable storage medium of claim 19, wherein processor is further for executing the at least one computer program to perform following operations:

determining that one of the ICG cells is expected to fall into a reset deadlock state if the one of the ICG cells satisfies a reset deadlock checking property; and determining that one of the ICG cells is expected to fall into a run deadlock state if the one of the ICG cells satisfies a run deadlock checking property.

\* \* \* \* \*